(12) United States Patent
Oshiro (10) Patent No.: US 10,475,635 B2
(45) Date of Patent: Nov. 12, 2019

(54) VOLTAGE APPLICATION METHOD, VOLTAGE APPLICATION DEVICE, AND TIME-OF-FLIGHT MASS SPECTROMETER

(71) Applicant: SHIMADZU CORPORATION, Kyoto-shi, Kyoto (JP)

(72) Inventor: Tomoyuki Oshiro, Kyoto (JP)

(73) Assignee: SHIMADZU CORPORATION, Kyoto-shi, Kyoto (JP)

(*) Notice: Subject to any disclaimer, the term of this patent is extended or adjusted under 35 U.S.C. 154(b) by 0 days.

(21) Appl. No.: 16/085,186

(22) PCT Filed: Mar. 18, 2016

(86) PCT No.: PCT/JP2016/058823
§ 371 (c)(1),
(2) Date: Sep. 14, 2018

(87) PCT Pub. No.: WO2017/158842
PCT Pub. Date: Sep. 21, 2017

(65) Prior Publication Data
US 2019/0088460 A1    Mar. 21, 2019

(51) Int. Cl.
*H01J 49/40* (2006.01)
*H01J 49/02* (2006.01)
(Continued)

(52) U.S. Cl.
CPC .......... *H01J 49/401* (2013.01); *H01J 49/022* (2013.01); *H01J 49/067* (2013.01); *H01J 49/40* (2013.01); *H02H 3/18* (2013.01)

(58) Field of Classification Search
CPC ........ H01J 49/022; H01J 49/067; H01J 49/40; H01J 49/401; H02H 3/18
See application file for complete search history.

(56) References Cited

U.S. PATENT DOCUMENTS 6,384,410 B1 * 5/2002 Kawato ............... H01J 49/405
250/281
6,469,296 B1 * 10/2002 Hansen ............... H01J 49/403
250/282
(Continued)

FOREIGN PATENT DOCUMENTS

EP    1 310 982 A2    5/2003
WO    2007/029327 A1    3/2007
WO    2012/132550 A1    10/2012

OTHER PUBLICATIONS

International Search Report of PCT/JP2016/058823 dated Jun. 14, 2016 [PCT/ISA/210].
(Continued)

*Primary Examiner* — David E Smith
(74) *Attorney, Agent, or Firm* — Sughrue Mion, PLLC (57) ABSTRACT

Voltages are applied by a voltage application device having an electrode circuit including a plurality of electrode connection parts connected in series via a resistance R between neighboring electrode connection parts; and power sources P for outputting both positive and negative polarities, each power source connected to both ends of the electrode circuit. The method of applying a voltage includes determining a polarity and a magnitude of an output voltage of so that a voltage having a predetermined polarity and magnitude is applied to the electrodes; and based on the polarities, switching the polarities of the output voltages by switching the polarities of the output voltages of the plurality of power sources P one at a time while maintaining a state where a polarity of an output voltage of at least one power source P, among the plurality of power sources P, is different from others.

6 Claims, 4 Drawing Sheets

(51) Int. Cl.
*H01J 49/06* (2006.01)
*H02H 3/18* (2006.01)

(56) References Cited

U.S. PATENT DOCUMENTS

| | | | |
|---|---|---|---|
| 9,552,975 B2* | 1/2017 | Brown | H01J 49/06 |
| 9,728,386 B1* | 8/2017 | Knecht | H01J 49/022 |
| 2008/0272289 A1* | 11/2008 | Vestal | H01J 49/025 |
| | | | 250/287 |
| 2009/0230297 A1 | 9/2009 | Mizutani | |
| 2010/0327157 A1* | 12/2010 | Green | H01J 49/065 |
| | | | 250/282 |
| 2014/0008531 A1 | 1/2014 | Furuhashi et al. | |
| 2017/0125234 A1* | 5/2017 | Rather | H01J 49/429 |

OTHER PUBLICATIONS

Communication dated Feb. 21, 2019 from European Patent Office in counterpart EP Application No. 16894460.1.

* cited by examiner

(a) PRESENT EMBODIMENT

|  | Before switching | | switch Power source P3 | | switch Power source P1 | | switch Power source P2 | | switchpower source P4 (completed) | |
| --- | --- | --- | --- | --- | --- | --- | --- | --- | --- | --- |
|  | polarity | Current direction | polarity | Current direction | polarity | Current direction | polarity | Current direction | polarity | Current direction |
| Power source P1 | - | forward | - | forward | + | forward | + | forward | + | forward |
| Power source P2 | - | forward | - | forward | - | forward | + | forward | + | forward |
| Power source P3 | + | forward | - | forward | - | forward | - | forward | - | forward |
| Power source P4 | + | forward | + | forward | + | forward | + | forward | - | forward |

(b) COMPARATIVE EXAMPLE

|  | Before switching | | switch Power source P1 | | switch Power source P2 | | switch Power source P3 | | switchpower source P4 (completed) | |
| --- | --- | --- | --- | --- | --- | --- | --- | --- | --- | --- |
|  | polarity | Current direction | polarity | Current direction | polarity | Current direction | polarity | Current direction | polarity | Current direction |
| Power source P1 | - | forward | + | forward | + | forward | + | forward | + | forward |
| Power source P2 | - | forward | - | forward | + | forward | + | forward | + | forward |
| Power source P3 | + | forward | + | forward | + | reverse | - | forward | - | forward |
| Power source P4 | + | forward | + | forward | + | reverse | + | reverse | - | forward |

VOLTAGE APPLICATION METHOD, VOLTAGE APPLICATION DEVICE, AND TIME-OF-FLIGHT MASS SPECTROMETER

CROSS REFERENCE TO RELATED APPLICATIONS

This application is a National Stage of International Application No. PCT/JP2016/058823, filed Mar. 18, 2016.

TECHNICAL FIELD

The present invention relates to a voltage application technology for applying predetermined voltages to a plurality of electrodes by using a plurality of power sources. In particular, the present invention relates to a voltage application technology that can be suitably used when a predetermined voltage is applied to each of the plurality of electrodes to form a potential allowing ions to fly in an ion flight space, in a time-of-flight mass spectrometer.

BACKGROUND ART

In a time-of-flight mass spectrometer (which is hereinafter called the "TOF-MS"), a fixed amount of kinetic energy is imparted to ions, which are derived from a sample component, entering an ion acceleration region positioned at an entry port of a mass separator to make those ions fly a specific distance within a flight space and determine the mass-to-charge ratio of each ion from its time of flight.

A system of imparting the kinetic energy to the ions in the time-of-flight mass spectrometer includes an orthogonal acceleration (which may also be called "vertical acceleration" or "orthogonal extraction") system. In the orthogonal acceleration TOF-MS, ions entering the ion acceleration region (orthogonal acceleration unit) are introduced to the flight space while being accelerated in a direction orthogonal to its entering direction, and allowed to fly therein. Therefore, the ions can be analyzed with a high mass-resolving power without being influenced by a variation in flight speed (energy) of the ions introduced in the orthogonal acceleration unit (for example, see Patent Literature 1).

Figure 1:
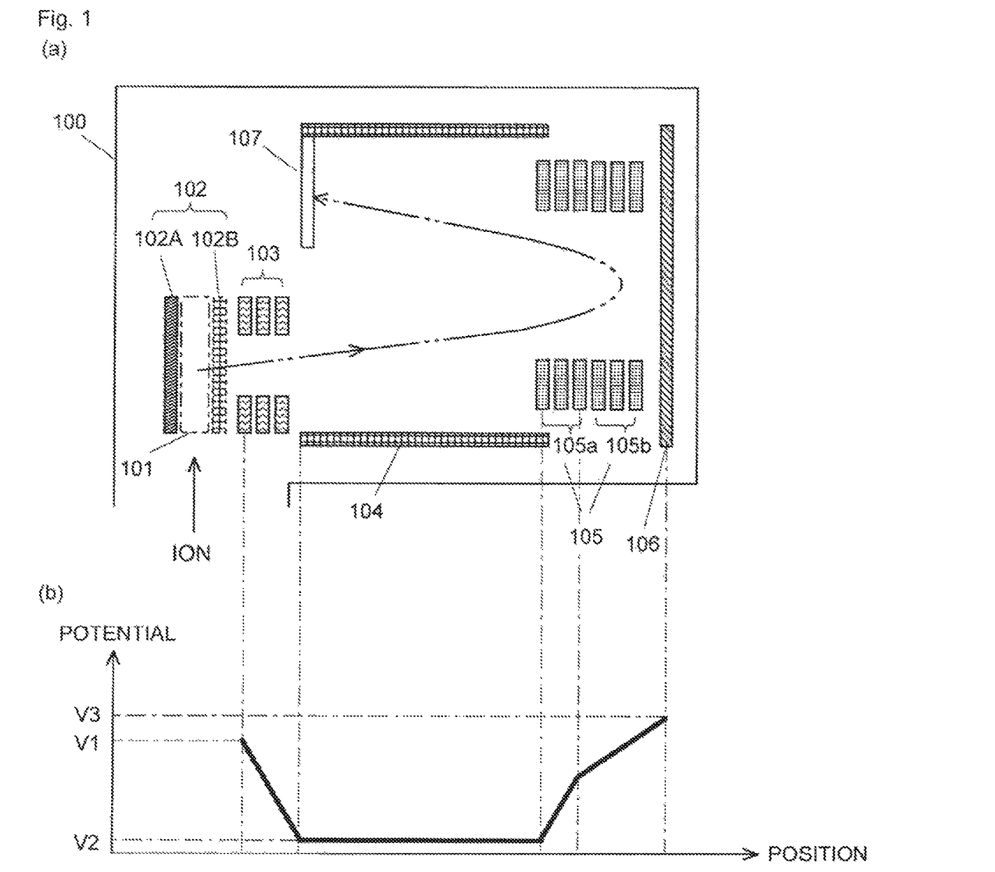
FIGS. 1(a) and 1(b) are schematic configuration diagrams of an ion flight space of a conventional time-of-flight mass spectrometer.

FIG. 1(a) illustrates an example of a schematic configuration of a mass separator 100 of an orthogonal acceleration reflectron TOF-MS.

Ions ejected from a prior stage (lower part of FIG. 1(a)) of the mass separator 100 enter an ion acceleration region of orthogonal acceleration electrodes 102 (formed of a pair of electrodes 102A and 102B arranged to face each other, where the electrode 102B is a grid electrode), and are accelerated in a direction orthogonal to the entering direction (toward the grid electrode 102B). The ions passing through the grid electrode 102B are further accelerated by acceleration electrodes (second acceleration electrodes) 103 arranged on both sides of an ion trajectory, and are incident into a flight space of which the outer end is defined by a flight tube 104. The ions incident into the flight space are gradually decelerated after being incident into a space formed by reflectron electrodes 105 and a back plate 106, and then, the ions are incident into a detector 107 along its returned flight path.

In order that the ions flying toward the flight space from the orthogonal acceleration electrodes 102 are made to fly along such a trajectory, voltages with an appropriate magnitude are applied to the second acceleration electrodes 103, the flight tube 104, the reflectron electrodes 105, and the back plate 106 to form a potential having a gradient decreasing toward the flight tube 104 from the second acceleration electrodes 103 and increasing toward the reflectron electrodes 105 and the back plate 106 from the flight tube 104, as illustrated in FIG. 1(b).

Figure 2:
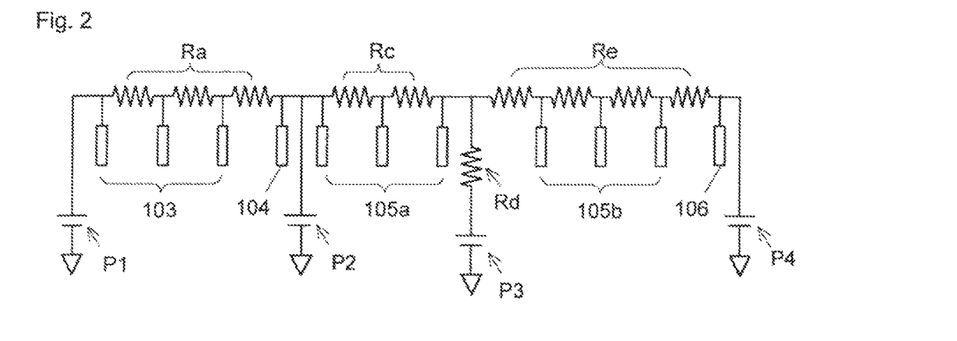
FIG. 2 is a diagram showing a configuration of an electrode circuit including power sources in the conventional time-of-flight mass spectrometer.

FIG. 2 is an example of an electrode circuit of a voltage application device for applying voltages to the second acceleration electrodes 103, the flight tube 104, the reflectron electrodes 105, and the back plate 106. In the electrode circuit, a plurality of resistances are connected in series between two power sources P1 and P4 at both ends, an electrode connection part is arranged between neighboring resistances, and power sources P2 and P3 are also connected at two different locations intermediate the both ends.

Between the power source P1 and the power source P2, four electrode connection parts and three resistances Ra are alternately provided. The three electrode connection parts closer to the power source P1 are connected to the second acceleration electrodes 103, and the electrode connection part closer to the power source P2 is connected to the flight tube 104, respectively.

Between the power source P2 and the power source P3, the three electrode connection parts and the two resistances Rc are alternately provided, and the three electrode connection parts are connected to the front side reflectron electrodes 105a.

Between the power source P3 and the power source P4, the four resistances Re and the four electrode connection parts are alternately provided. The three electrode connection parts closer to the power source P3 are connected to a rear side reflectron electrodes 105b, and the electrode connection part closer to the power source P4 is connected to the back plate 106, respectively.

It is noted that the power source P3 is connected via a resistance Rd to the electrode circuit.

From each of the power sources P1 to P4, a voltage is outputted having a polarity (the same polarity as the ions or an opposite polarity to the ions) according to the polarity of an ion to be measured, and having a magnitude according to a potential formed in each unit. For example, during positive ion analysis, a voltage of V1 (for example, −3 kV), a voltage of V2 (for example, −7 kV), a voltage of V3 (for example, +2 kV), and a voltage of V4 (for example, +2 kV) are output from the power sources P1 to P4, respectively (first state). During negative ion analysis, the polarity of the output voltage of each of the power sources P1 to P4 is reversed (second state). When the positive ions and the negative ions generated from a sample are measured in turn, the positive ions are firstly measured in the first state, and then, the first state is switched to the second state where the negative ions are measured.

CITATION LIST

Patent Literature

Patent Literature 1: WO 2012/132550 A1
Patent Literature 2: WO 2007/029327 A1

SUMMARY OF INVENTION

Technical Problem

Generally, the polarity of the output voltage is switched after the power source is disconnected from the electrode circuit, or after the output voltage is changed to neutral. On the other hand, Patent Literature 2 describes a power source configured so that the polarity of the output voltage can be switched while the power source is connected to the electrode circuit. This voltage output device does not require the disconnection or neutral change of the electrode circuit, so that it is possible to shorten a switching time of the polarity of the output voltage. However, when the first state and the second state are switched in the voltage application device provided with the plurality of power sources P1 to P4 as described above, if the polarities of the output voltages of the four power sources P1 to P4 are switched in turn while the power sources are connected to the electrode circuit, by the time that the switching between the states is completed, a current (reverse current) opposite in polarity to the output voltage of some of the power sources flows through the power sources, resulting in a problem that the power sources may be destroyed.

Here, description is given by using an example of the voltage application device of the time-of-flight mass spectrometer using a plurality of electrodes to form a predetermined potential in the ion flight space; however, a problem as described above is also found in another voltage application device for similarly applying the voltage to the plurality of electrodes from the plurality of power sources.

The problem to be solved by the present invention is to provide a voltage application device of applying predetermined voltages to a plurality of electrodes by using a plurality of power sources, by which it is possible to reduce a risk that a reverse current flows through a power source when the polarities of output voltages of the power sources are switched.

Solution to Problem

A first aspect of the present invention developed for solving the previously described problems is a method, using a voltage application device including: an electrode circuit including a plurality of electrode connection parts connected in series via a resistance between neighboring electrode connection parts; and power sources capable of outputting a voltage of both positive and negative polarities, the power sources each being connected to both ends and at least in one intermediate position of the electrode circuit, of applying voltages to a plurality of electrodes each connected to each of the plurality of electrode connection parts, the method including the steps of:

a) determining a polarity and a magnitude of an output voltage of each of the plurality of power sources so that a voltage having a predetermined polarity and magnitude is applied to each of the plurality of electrodes; and b) based on the polarities of the output voltages of the plurality of power sources, switching the polarity of the output voltage of the plurality of power sources by switching the polarity of the output voltage of each of the plurality of power sources one at a time while maintaining a state where the polarity of the output voltage of at least one power source among the plurality of power sources is different from the others.

In the voltage application device described above, through which of the power sources the reverse current flows when the polarities of the output voltages of the plurality of power sources are switched in turn depends on a configuration parameter such as the magnitude and the number of resistances to be used, the number of power sources and connecting positions of these power sources, and the polarities and the magnitudes of the output voltages. Even when the polarities of the output voltages of all the power sources are the same, if there is a difference in the magnitude of the output voltages, the reverse current flows anyway through one of the power sources irrespective of the configuration parameter. In the voltage application method of the present invention, the state where the polarity of the output voltage of at least one power source among the plurality of power sources is different from the others is maintained, so that the current will primarily flow between the power sources different in polarity, and thus, this prevents the reverse current flowing through the power source and reduces a risk of a power source being destroyed.

The voltage application device, which is a second aspect of the present invention developed for solving the previously described problem, includes:

a) an electrode circuit including a plurality of electrode connection parts connected in series via a resistance between neighboring electrode connection parts;

b) a plurality of power sources capable of outputting a voltage of both positive and negative polarities, the plurality of power sources each being connected to both ends and at least in one intermediate position of the electrode circuit;

c) a storage section in which output voltage information and polarity switching order information determined based on the output voltage information are stored, the output voltage information being information on the polarities and the magnitudes of the output voltages of the plurality of power sources and the polarity switching order information being information on an order of switching the polarities of the output voltages of all the power sources by switching the polarity of the output voltage of the plurality of power sources one at a time while maintaining a state where the polarity of the output voltage of at least one power source among the plurality of power sources is different from the others; and d) a power source control unit for outputting the voltages with the polarities and the magnitudes based on the output voltage information from the plurality of power sources, and switching in turn the polarity of the output voltage of each of the plurality of power sources, based on the polarity switching order information at a predetermined timing.

The predetermined timing is a timing at which the polarity of an ion to be measured is switched in the time-of-flight mass spectrometer, for example. In this case, it is possible to configure that the power source control unit switches the polarity of the output voltage in receipt of a signal from a measurement control unit for controlling a measurement.

It is preferable that the order to switch the polarities of the output voltages of the plurality of power sources is the order in which a total number of power sources through which the reverse current flows is a minimum among all the possible switching orders. The total number of power sources through which the reverse current flows can be defined from the number of times that the reverse current flows to any one of the power sources and the number of power sources through which the reverse current flows. For example, if the reverse current flows through two power sources at one stage and the reverse current flows through one power source at another stage until the switching of the polarities of the output voltages of all the power sources is completed, the total number is "3". As discussed above, the power source through which the reverse current may flow depends on the configuration parameter, and thus, it is not possible to uniformly determine the power source; however, after the configuration parameter is determined, the power source may be determined based on a simulation or the like.

In an ideal situation in the voltage application device according to the present invention, no reverse current flows through any power source while the polarities of the output voltages of the plurality of power sources are switched in turn. However, it may be inevitable that, depending on the configuration parameter, the reverse current flows through at least one power source, as in a case of, for example, forming a V-shaped potential in the flight space of ions.

Therefore, in the voltage application device according to the present invention, it is further preferable that a resistance is connected in parallel to the power source through which the reverse current flows while the power source control unit switches the polarity of the output voltage of each of the plurality of power sources.

When the resistance is provided in parallel to the power source, the amount of current flowing from the power source increases as compared to a case where there is no resistance, and the reverse current flows through the circuit at the resistance side, and thus, it is possible to prevent the flow of the reverse current to the power source.

Advantages Effects of Invention

When a voltage application technology according to the present invention is employed, it is possible to reduce a risk that a reverse current flows through a power source while polarities of output voltages of a plurality of power sources of a voltage application device are switched.

DESCRIPTION OF EMBODIMENTS

An embodiment of a voltage application method and a device therefor according to the present invention will be described with reference to the drawings, below. The voltage application method and the device therefor according to the present embodiment are employed in an orthogonal acceleration time-of-flight mass spectrometer (TOF-MS) in which a pulse voltage is applied, in a predetermined cycle, to a pair of electrodes arranged in an orthogonal acceleration unit to forward ions into a flight space, and based on a time of flight in the flight space, a mass-to-charge ratio of each ion is determined so as to form a below-described potential in the flight space of ions.

Figure 3:
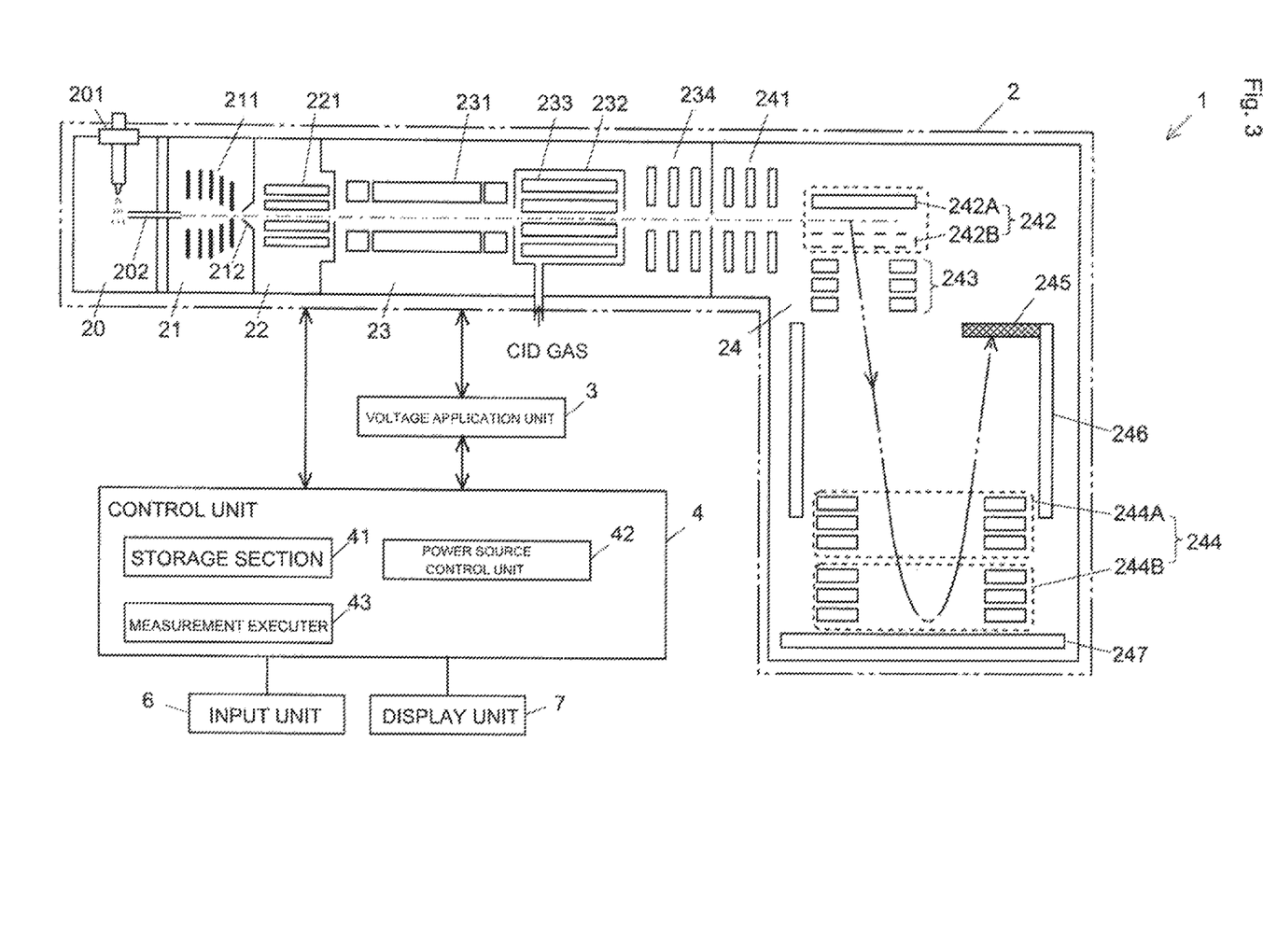
FIG. 3 is a schematic configuration diagram of a time-of-flight mass spectrometer having a voltage application device according to the present invention.

FIG. 3 illustrates a schematic configuration of a TOF-MS 1 of the present embodiment. The TOF-MS 1 of the present embodiment is formed mainly of a mass spectrometer unit 2, a voltage application unit 3, and a control unit 4 for controlling an operation of these components.

The mass spectrometer unit 2 has a configuration forming a multi-stage differential pumping system including an ionization chamber 20 maintained at approximately atmospheric pressure and an analysis chamber 24 evacuated to a high degree of vacuum by a vacuum pump (not shown), between which first, second and third intermediate chambers 21, 22 and 23 are provided having their degrees of vacuum increased in a stepwise manner. The ionization chamber 20 is provided with an electrospray ionization probe (ESI probe) 201 for spraying a liquid sample while imparting electric charges to the same sample.

The ionization chamber 20 communicates with the first intermediate chamber 21 through a heated capillary 202. The first intermediate chamber 21 is separated from the second intermediate chamber 22 by a skimmer 212 having a small hole at its apex. The first and second intermediate chambers 21 and 22 respectively contain ion guides 211 and 221 for transporting ions to the next stage while converging the ions. The third intermediate chamber 23 contains a quadrupole mass filter 231 for separating ions according to their mass-to-charge ratios, a collision cell 232 containing a multipole ion guide 233, and an ion guide 234 for transporting ions ejected from the collision cell 232. A CID gas, such as argon or nitrogen, is supplied into the collision cell 232, when necessary.

The ions ejected from the collision cell 232 located in the third intermediate chamber 23 enter an ion acceleration region of an orthogonal acceleration electrode 242 (formed of a pair of electrodes 242A and 242B arranged to face each other where the electrode 242B is a grid electrode), and are accelerated in a direction orthogonal to the entering direction (toward the grid electrode 242B). The ions passing through the grid electrode 242B are further accelerated by acceleration electrodes (second acceleration electrodes) 243 arranged on both sides of an ion trajectory, and are incident into the ion flight space. The ions incident into the ion flight space are gradually decelerated after being incident on a returning region formed by a reflectron electrode 244 and a back plate 247, by a below-described potential formed in the space. Then, the ions are incident on a detector 245 along its returned flight path.

The voltage application unit 3 applies a predetermined voltage to an electrode at each part of the mass spectrometer unit 2, and in particular, has a characteristic in its operation to apply the predetermined voltage to each electrode arranged in the ion flight space of the analysis chamber 24. This operation will be described later.

The control unit 4 includes a storage section 41, and the following functional blocks: a power source control section 42 and a measurement executer 43. The control unit 4 is actually a personal computer, and the functional block is operated by executing a program previously installed on the computer. Additionally, an input unit 6 and a display unit 7 are connected to the control unit 4.

Figure 4:
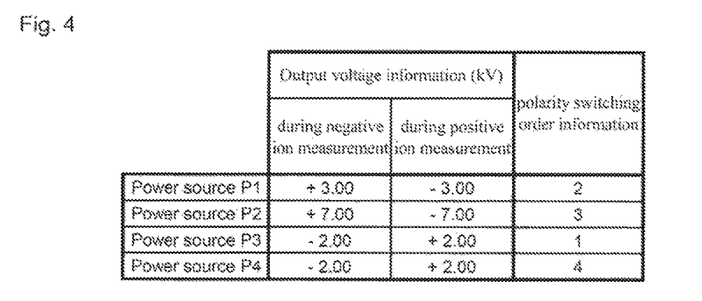
FIG. 4 is a table of an example of output voltage information and polarity switching order information in the present embodiment.

In the storage section 41, output voltage information on the polarity and the magnitude of the voltage to be output from each power source connected to the electrode circuit of the voltage application unit 3, and polarity switching order information on switching of the polarity of each power source determined based on the output voltage information are stored. In the present embodiment, the output voltage information and the polarity switching order information as shown in FIG. 4 are stored. Further, a measurement condition created by a user and a measurement result obtained by using the measurement condition are saved, where appropriate.

Next, a characteristic configuration and operation, in the present embodiment, of the voltage application unit 3 are described.

Figure 5:
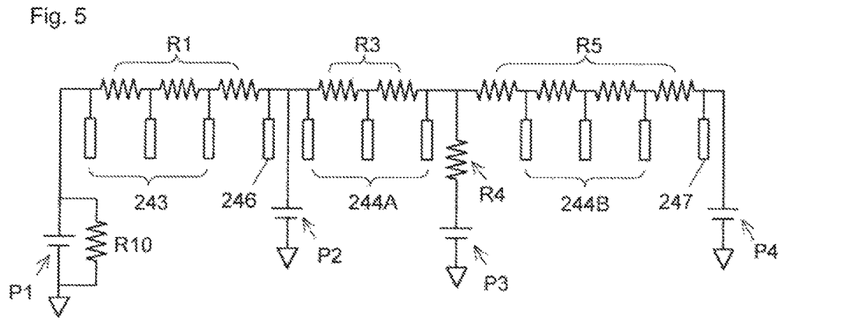
FIG. 5 is a diagram showing a configuration of an electrode circuit including power sources in a time-of-flight mass spectrometer of the present embodiment.

FIG. 5 illustrates an electrode circuit for applying voltages to the second acceleration electrode 243, a flight tube 246, reflectron electrodes 244A and 244B, and the back plate 247. Components illustrated in FIG. 5 and the control unit 4 correspond to the voltage application device according to the present invention.

Between a power source P1 and a power source P2, four electrode connection parts and three resistances R1 (total resistance of 200 MΩ) are alternately provided. The three electrode connection parts closer to the power source P1 are connected to the second acceleration electrode 243, and the electrode connection part closer to the power source P2 is connected to the flight tube 246, respectively.

Between the power source P2 and the power source P3, the three electrode connection parts and the two resistances R3 (total resistance of 900 MΩ) are alternately provided, and the three electrode connection parts are connected to the front side reflectron electrode 244A.

Between the power source P3 and the power source P4, four resistances R5 (total resistance of 700 MΩ) and four electrode connection parts are alternately provided. Three electrode connection parts closer to the power source P3 are connected to the rear side reflectron electrode 244B, and the electrode connection part closer to the power source P4 is connected with the back plate 247, respectively.

It is noted that the power source P1 is connected with a resistance R10 of 100 MΩ in parallel to the power source P1, and the power source P3 is connected via a resistance R4 of 700 MΩ to the electrode circuit.

Here, an operation of the voltage application device of the present embodiment is described by using a case where positive ions are measured first and then negative ions are measured. However, in the present embodiment, a characteristic operation of the voltage application device will be described in detail, and other operations will not be described.

Figure 6:
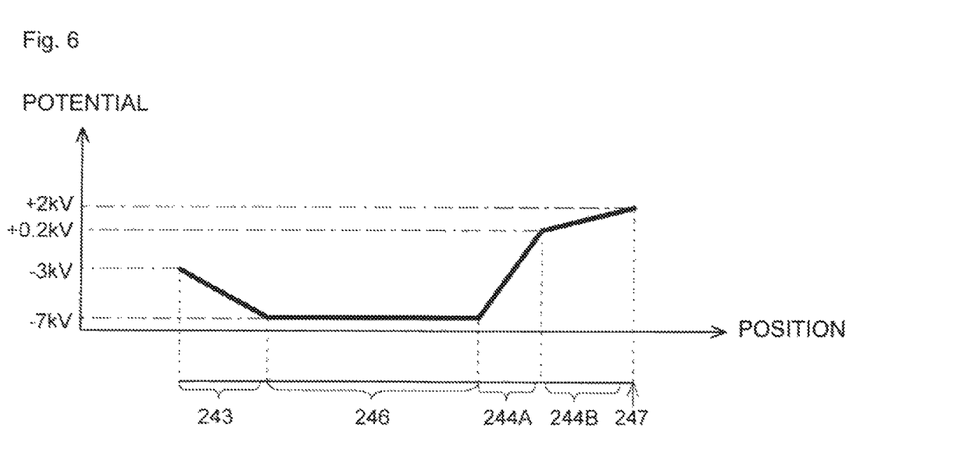
FIG. 6 is a graph describing a potential formed in an ion flight space of the time-of-flight mass spectrometer of the present embodiment.

When a command to start a measurement is inputted through the input unit 6 by a user, the measurement executer 43 reads a measurement condition (including the output voltage application information and the polarity switching order information) from the storage section 41, sets each component to a measuring state, and transmits the output voltage application information and the polarity switching order information to the power source control unit 42. The power source control unit 42 controls so that the power sources P1 to P4 output voltages of −3 kV, −7 kV, +2 kV, and +2 kV, respectively. Thus, in the ion flight space, a potential shown in FIG. 6 is formed.

Figure 7:
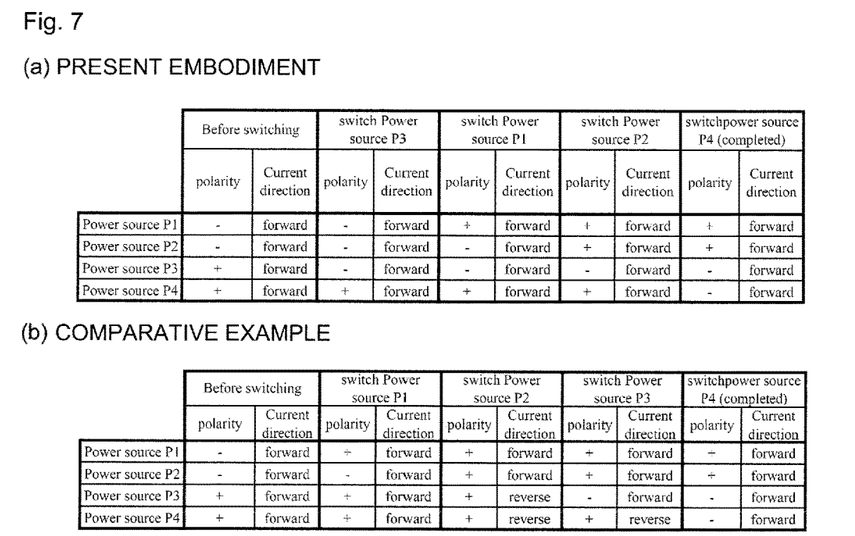
FIGS. 7(a) and 7(b) are tables describing a polarity switching order of output voltages and directions of current flows, in the present embodiment.

After the positive ions are measured for a predetermined time period, the measurement executer 43 switches the ions to be measured from the positive ions to the negative ions and transmits a synchronization signal to the power source control unit 42. In response thereto, the power source control unit 42 switches, one at a time, the polarities of the output voltages of the power sources P1 to P4, based on the polarity switching order information. In the present embodiment, as illustrated in FIG. 7(a), the polarities of the output voltages are switched one at a time in the order of the power sources P3, P1, P2, and P4. As understood from FIG. 7(a), in the present embodiment, when the polarities of the output voltages of the power sources P1 to P4 are sequentially switched depending on the polarity of the ions to be measured, the polarity switching order is previously determined so that no reverse current flows through any one of the power sources and is stored in the storage section 41.

As in a comparative example shown in FIG. 7(b), when the polarities of the output voltages are switched in the order of the power sources P1 to P4, the output voltages from all the power sources will have the same polarity at a time point that the polarity of the output voltage of the power source P2 is switched. When all the output voltages have the same polarity as described above, there is a risk that the power source is destroyed as a result of the reverse current flowing through at least one power source irrespective of the configuration of the electrode circuit. In an example shown in FIG. 7(b), the reverse current flows through the power sources P3 and P4 at a time point that the output voltage of the power source P2 is switched, and the reverse current flows through the power source P4 at a time point that the polarity of the output voltage of the power source P3 is switched.

In contrast, the TOF-MS 1 of the present embodiment is configured so that when the polarities of the output voltages of the power sources P1 to P4 are switched during the switching of the ions to be measured, no reverse current flows through any one of the power source, and thus, it is possible to prevent the power source from being destroyed.

As in the present embodiment, when a V-shaped potential is formed in the ion flight space, it is inevitable that the reverse current flows through the power source P1 during the measurement of the ions, and thus, the resistance R10 is connected in parallel to the power source P1. Although this results in a need of increasing the current output from the power source P1, if the current is flowed to a side of the circuit to which the parallel resistance is connected, it is possible to prevent the reverse current from flowing through the power source P1.

Figure 8:
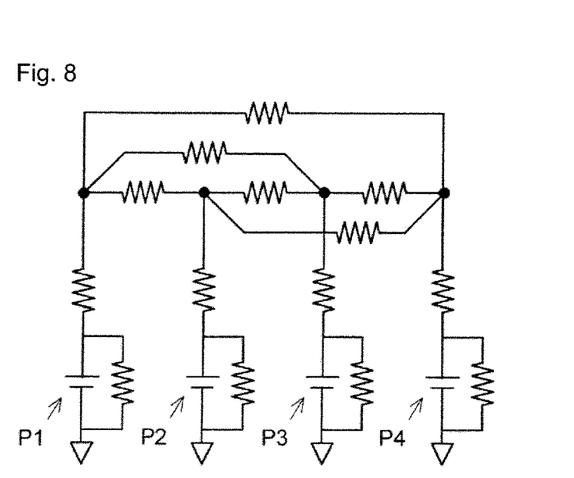
FIG. 8 is a diagram describing an example of an arrangement of resistances in another electrode circuit usable in the present embodiment.

The above embodiment is a mere example and can be appropriately modified within the spirit of the present invention. A specific numerical value and the arrangement of the power source and the resistance in the above embodiment are merely a specific example, and it is possible to adopt any configuration as a resistance circuit network for determining a voltage value applied to each electrode. For example, as illustrated in FIG. 8 (with the electrodes not illustrated), when a resistance is connected between neighboring electrodes, and a resistance value of the resistance and the output voltages from the power sources (P1 to P4) are set, it is possible to form an appropriate potential suitable to the flight of ions.

Figure 9:
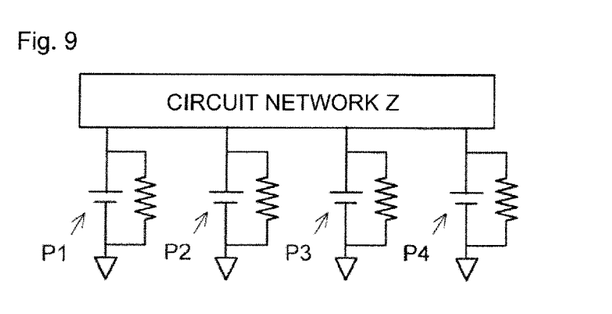
FIG. 9 is a diagram illustrating, as one circuit network, an arbitrary arrangement of resistances in an electrode circuit usable in the present embodiment.

As illustrated in FIG. 9 (with the electrodes not illustrated), it is also possible to use any circuit network Z in which the number of resistances to be used is minimized while realizing a desired function. Generally, the TOF-MS requires high mass accuracy of ppm level, and thus, it is necessary to use a highly accurate, expensive resistance with a high withstanding voltage characteristic, for a resistance connected to an electrode arranged in the flight space. When the circuit network Z as illustrated in FIG. 9 is formed by using a minimum required number of resistances, it is possible to form a desired potential in the ion flight space while saving a cost for the resistance.

The voltage application device according to the present invention can also be used in a device other than the TOF-MS.

In the present embodiment, the parallel resistance is employed because it is inevitable that the reverse current flows through the power source P1; however, depending on a configuration of the electrode circuit, an arrangement of the power source, and an output voltage, the switching order of the polarities of the output voltages may be determined so that no reverse current flows through any power source. In such a case, there is no need of providing a parallel resistance for any power source.

Alternatively, reversely, parallel resistances R10 to R40 (Rn) may be provided in all the power sources P1 to P4 (Pn). As a result, even in a case where the power source control unit 42 is erroneously operated and there is an error in the polarity switching order information stored in the storage section 41, it is possible to prevent the reverse current from flowing through each of the power sources P1 to P4. Further, by providing parallel resistances each of which is connected to each of the power sources P1 to P4, it is possible to obtain an effect such as an amount of current to be flowed by each of the power sources P1 to P4 is stabled and a risk of discharge can be avoided.

It is noted that when the parallel resistance Rn is provided in the power source Pn, if the resistance Rn is small, the current normally flowing from the Pn is large, and this decreases a risk of reverse current; however, on the other hand, it is necessary to increase a capacity of the power source Pn, and thus, there arises a problem of an increase in size, a cost increase, or an increase in power consumption. Therefore, it is preferable that the Rn is as large as possible. Ideally, if the output impedance of each of the power sources P1 to P4 is 0, and a resistance Rn with a magnitude by which it is possible to flow a current equivalent in amount to the output current of each of the power sources P1 to P4 is employed, no reverse current flows through the power sources P1 to P4. A maximum value of Rn can be evaluated in accordance with $Vn/In\_inv\-max$, where $In\_inv\-max$ denotes a maximum value of a reverse current flowed, by all the power sources except for one power source Pn to be focused, through the power source Pn to be focused. However, an output impedance is present in the actual power source, and thus, the value of the resistance Rn can be made slightly larger than a value calculated as an ideal power source.

REFERENCE SIGNS LIST

1 . . . Time-of-flight mass spectrometer (TOF-MS)
2 . . . Mass Spectrometer Unit
20 . . . Ionization Chamber
21 . . . First Intermediate Chamber
22 . . . Second Intermediate Chamber
23 . . . Third Intermediate Chamber
24 . . . Analysis Chamber
241 . . . Ion Transport Electrode
242 . . . Orthogonal Acceleration Electrode (First Acceleration Electrode)
243 . . . Second Acceleration Electrode
244 . . . Reflectron Electrode
245 . . . Detector
246 . . . Flight Tube
247 . . . Back Plate
3 . . . Voltage Application Unit
4 . . . Control Unit
41 . . . Storage Section
42 . . . Power Source Control Unit
43 . . . Measurement Executer
6 . . . Input Unit
7 . . . Display Unit
P . . . Power Source
R . . . Resistance

The invention claimed is:

1. A method of applying voltages to a plurality of electrodes each respectively connected to a plurality of electrode connection parts, by employing a voltage application device including: an electrode circuit including the plurality of electrode connection parts connected in series via a resistance between neighboring electrode connection parts; and power sources capable of outputting a voltage of both positive and negative polarities, the power sources being respectively connected to both ends and at least in one intermediate position of the electrode circuit, the method comprising the steps of:
   a) determining a polarity and a magnitude of an output voltage of each of the plurality of power sources so that a voltage having a predetermined polarity and magnitude is applied to each of the plurality of electrodes; and
   b) based on the polarities of the output voltages of the plurality of power sources, switching the polarities of the output voltages of the plurality of power sources by switching the polarities of the output voltages of the plurality of power sources one at a time while maintaining a state where a polarity of an output voltage of at least one power source among the plurality of power sources is different from others.

2. A voltage application device, comprising:
   a) an electrode circuit including a plurality of electrode connection parts connected in series via a resistance between neighboring electrode connection parts;
   b) a plurality of power sources capable of outputting a voltage of both positive and negative polarities, the plurality of power sources being respectively connected to both ends and at least in one intermediate position of the electrode circuit;
   c) a storage section in which output voltage information and polarity switching order information determined based on the output voltage information are stored, the output voltage information being information on the polarity and the magnitude of the output voltage of each of the plurality of power sources and the polarity switching order information being information on an order of switching the polarities of the output voltages of all the power sources by switching the polarity of the output voltage of the plurality of power sources one at a time while maintaining a state where the polarity of the output voltage of at least one power source among the plurality of power sources, is different from others; and
   d) a power source control unit for outputting the voltages with the polarities and the magnitude based on the output voltage information, from the plurality of power sources and switching in turn the polarities of the output voltages of the plurality of power sources, based on the polarity switching order information at a predetermined timing.

3. The voltage application device according to claim 2, wherein the order of switching the polarity of the output voltage of the plurality of power sources is an order in which a total number of power sources through which a reverse current flows is a minimum.

4. The voltage application device according to claim 2, wherein some power sources out of the plurality of power sources are connected with a resistance, in parallel to the power source.

5. The voltage application device according to claim 2, wherein a power source through which a reverse current flows while the power source control unit switches the polarity of the output voltage of the plurality of power sources is connected with a resistance in parallel to the power source.

6. A time-of-flight mass spectrometer, comprising the voltage application device according to claim 2.

* * * * *